(12) United States Patent
Ono et al.

(10) Patent No.: US 11,348,447 B2
(45) Date of Patent: May 31, 2022

(54) ALARM MANAGEMENT SYSTEM AND ALARM MANAGEMENT METHOD

(71) Applicant: Yokogawa Electric Corporation, Musashino (JP)

(72) Inventors: Yusuke Ono, Musashino (JP); Kengo Honda, Musashino (JP); Kazuki Murayama, Musashino (JP); Motoichi Kuwatani, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/984,713

(22) Filed: Aug. 4, 2020

(65) Prior Publication Data

US 2021/0043068 A1 Feb. 11, 2021

(30) Foreign Application Priority Data

Aug. 6, 2019 (JP) .............................. JP2019-144753

(51) Int. Cl.
| | |
|---|---|
| *G08B 29/18* | (2006.01) |
| *G05B 23/02* | (2006.01) |
| *G08B 25/00* | (2006.01) |
| *G08B 29/04* | (2006.01) |

(52) U.S. Cl.
CPC ......... *G08B 29/18* (2013.01); *G05B 23/0272* (2013.01); *G08B 25/008* (2013.01); *G08B 29/04* (2013.01)

(58) Field of Classification Search
CPC ...... G08B 29/18; G08B 25/008; G08B 29/04; G05B 23/0272

USPC ......................................................... 702/127
See application file for complete search history.

(56) References Cited

U.S. PATENT DOCUMENTS

| | | | |
|---|---|---|---|
| 9,373,246 B2 * | 6/2016 | Fiske | ...................... G08B 5/36 |
| 2004/0148130 A1 | 7/2004 | Scott et al. | |
| 2010/0019894 A1 | 1/2010 | Okada | |
| 2011/0010654 A1 | 1/2011 | Raymond et al. | |

FOREIGN PATENT DOCUMENTS

| | | |
|---|---|---|
| DE | 102004003605 A1 | 11/2004 |
| JP | 5-108412 A | 4/1993 |
| JP | 10-307977 A | 11/1998 |
| JP | 2002-325133 A | 11/2002 |
| JP | 2004-234655 A | 8/2004 |
| JP | 2005-182622 A | 7/2005 |
| JP | 2009-246001 A | 10/2009 |
| JP | 2010-224893 A | 10/2010 |
| JP | 2010-271837 A | 12/2010 |

* cited by examiner

*Primary Examiner* — John A Tweel, Jr.
(74) *Attorney, Agent, or Firm* — Sughrue Mion, PLLC

(57) ABSTRACT

An alarm management system of the present disclosure includes an alarm management apparatus, a monitoring terminal, and a controller. The alarm management apparatus generates an alarm based on information received from the controller or receives an alarm from the controller, receives information related to a filtering condition from the monitoring terminal, performs filtering on the alarm based on the filtering condition, and presents the alarm subjected to the filtering to an operator via the monitoring terminal.

8 Claims, 5 Drawing Sheets

FIG. 2

| Level | Time of occurrence | Alarm identification information | Message content | Operation mode |
|---|---|---|---|---|
| 1 | 10:00 | UP-002 358 | *** | △△ |
| 3 | 10:10 | UP-002 358 | *** | □□ · Not confirmed |

ALARM MANAGEMENT SYSTEM AND ALARM MANAGEMENT METHOD

CROSS-REFERENCE TO RELATED APPLICATION

The present application claims priority to and the benefit of Japanese Patent Application No. 2019-144753 filed Aug. 6, 2019, the entire contents of which are incorporated herein by reference.

TECHNICAL FIELD

The present disclosure relates to an alarm management system and an alarm management method.

BACKGROUND

The monitoring terminal of an operator is notified of an abnormality detected in a plant or the like as an alarm. The operator recognizes the alarm displayed on a display of the monitoring terminal and responds to the abnormality.

In patent literature (PTL) 1, a server transmits alarm message information received from a facility-side terminal to every monitoring terminal. Upon receiving the alarm message information from the server, each monitoring terminal uses an alarm message process judgment unit to confirm the authority, over the corresponding area, of the operator logged into the terminal. When the operator has authority over the corresponding area, the alarm message process judgment unit receives and displays the alarm message information. Conversely, when the operator does not have authority over the corresponding area, the alarm message process judgment unit discards the alarm message information.

CITATION LIST

Patent Literature

PTL 1: JP2010-271837A

SUMMARY

An alarm management system according to an embodiment includes an alarm management apparatus, a monitoring terminal, and a controller. The alarm management apparatus is configured to generate an alarm based on information received from the controller or receive an alarm from the controller, receive information related to a filtering condition from the monitoring terminal, perform filtering on the alarm based on the filtering condition, and present the alarm subjected to the filtering to an operator via the monitoring terminal.

An alarm management method according to an embodiment uses an alarm management system and the alarm management method executed by an alarm management apparatus includes generating an alarm based on information received from a controller or receive an alarm from the controller, receiving information related to a filtering condition from a monitoring terminal, performing filtering on the alarm based on the filtering condition, and presenting the alarm subjected to the filtering to an operator via the monitoring terminal.

BRIEF DESCRIPTION OF THE DRAWINGS

In the accompanying drawings:

FIG. 2 illustrates the case of only updated information being transmitted from an alarm management apparatus to a monitoring terminal;

DETAILED DESCRIPTION

Figure 1:
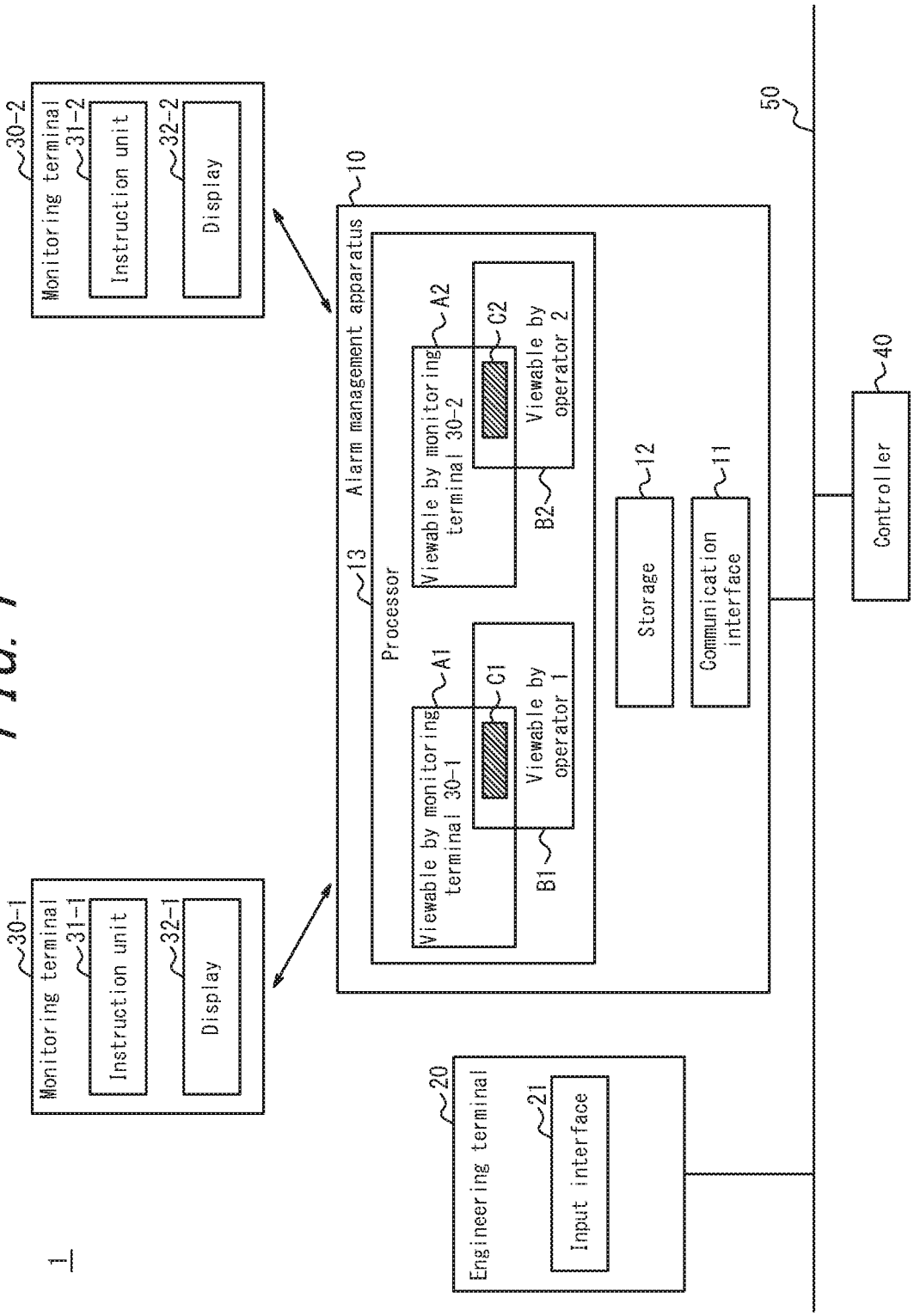
FIG. 1 illustrates the configuration of an alarm management system according to an embodiment of the present disclosure.

When each monitoring terminal receives the alarm message information from the server and then judges whether to display the alarm message information based on the authority of the operator as in PTL 1, the communication volume between the monitoring terminal and the server sometimes grows very large. In other words, the amount of communication between a server, such as an alarm management apparatus, and a monitoring terminal could be reduced.

The present disclosure therefore aims to provide an alarm management system and an alarm management method capable of reducing the communication volume between an alarm management apparatus and a monitoring terminal.

An alarm management system according to an embodiment includes an alarm management apparatus, a monitoring terminal, and a controller. The alarm management apparatus is configured to generate an alarm based on information received from the controller or receive an alarm from the controller, receive information related to a filtering condition from the monitoring terminal, perform filtering on the alarm based on the filtering condition, and present the alarm subjected to the filtering to an operator via the monitoring terminal.

In this way, alarms filtered on the alarm management apparatus side are presented to the operator via the monitoring terminal. The communication volume between the alarm management apparatus and the monitoring terminal can therefore be reduced.

In an embodiment, the filtering condition may include a first filtering condition and a second filtering condition.

In an embodiment, the first filtering condition may include a condition related to whether the alarm matches a viewing authority of the operator, and the second filtering condition may include a condition related to whether the alarm is a desired viewing target of the operator.

In an embodiment, the filtering condition may include a suppression condition of the alarm.

Suppression of the alarm can reduce the information amount and also prevent the operator from overlooking important alarms.

In an embodiment, the alarm management apparatus may, based on a comparison between a new alarm and an old alarm, be configured to identify updated information among information included in the new alarm, and the monitoring terminal may be configured to acquire only the updated information from the alarm management apparatus.

In this way, the monitoring terminal acquires only updated information from the alarm management apparatus. The communication volume between the alarm management apparatus and the monitoring terminal can therefore be further reduced.

An alarm management method according to an embodiment uses an alarm management system and the alarm management method executed by an alarm management apparatus includes generating an alarm based on information received from a controller or receive an alarm from the controller, receiving information related to a filtering condition from a monitoring terminal, performing filtering on the alarm based on the filtering condition, and presenting the alarm subjected to the filtering to an operator via the monitoring terminal.

In this way, alarms filtered on the alarm management apparatus side are presented to the operator via the monitoring terminal. The communication volume between the alarm management apparatus and the monitoring terminal can therefore be reduced.

The present disclosure can provide an alarm management system and an alarm management method capable of reducing the communication volume between an alarm management apparatus and a monitoring terminal.

Embodiments of the present disclosure are described below with reference to the drawings. Identical reference signs in the drawings indicate identical or equivalent constituent elements.

As illustrated in FIG. 1, an alarm management system 1 according to an embodiment of the present disclosure includes an alarm management apparatus 10, an engineering terminal 20, monitoring terminals 30-1, 30-2, and a controller 40.

The engineering terminal 20 can include an input interface 21 capable of receiving an operation by an engineer. The engineer can use the input interface 21 to create a definition file containing the filtering condition described below. The definition file created by the engineer is downloaded onto the monitoring terminals 30-1, 30-2. Examples of the engineering terminal 20 include a computer, such as a desktop PC; a smartphone; and a tablet.

The monitoring terminals 30-1, 30-2 (monitoring terminal 30) respectively include instruction units 31-1, 31-2 (instruction unit 31) that transmit information related to the filtering condition contained in the definition file downloaded from the engineering terminal 20 and displays 32-1, 32-2 (display 32) that display the result of processing by the alarm management apparatus 10. Examples of the monitoring terminal 30 include a computer such as a desktop PC; a smartphone; a tablet; or any other terminal. A plurality of operators may share the same (one) monitoring terminal 30. In this case, the monitoring terminal 30 identifies the operators based on login information of each operator. The "filtering conditions" are described below.

Examples of the filtering condition for determining whether to present the operator with an alarm, generated by a plant or the like, providing notification of the occurrence of an abnormality include a "condition related to whether access authority of the monitoring terminal is matched", a "condition related to whether viewing authority of the operator is matched", and a "condition related to whether the alarm is a desired viewing target of the operator". The "access authority of the monitoring terminal" refers to the authority determined for each monitoring terminal 30 based on the location of the plant or the like. For example, the monitoring terminal 30 can access storage areas of the alarm management apparatus 10 that match the access authority of the monitoring terminal 30. The "viewing authority of the operator" is the authority determined based on an area of monitoring responsibility of the operator logged into the monitoring terminal 30, a monitored apparatus, a monitoring period, and the like. For example, the operator can view alarms matching the viewing authority of the operator. The "desired viewing target of the operator" is, for example, a condition set appropriately by the operator when the operator does not need to view all of the alarms matching the viewing authority and desires to view only specific alarms. For example, the operator can designate alarms that are the desired viewing target by setting a condition such as the time of occurrence or occurrence duration of the alarm, the occurrence location (area or device), or operation mode. The filtering condition of the present disclosure is not limited to these examples and may be any condition.

The controller 40 is connected to a field device or the like and controls the field device. The controller 40 detects an abnormality of the field device, process, or the like, and transmits information related to the abnormality to the alarm management apparatus 10 via a control network 50. When the controller 40 includes a function to generate alarms, however, the controller 40 may detect an abnormality of the field device, process, or the like, generate an alarm based on the abnormality, and transmit the alarm to the alarm management apparatus 10 via the control network 50. FIG. 1 illustrates one controller 40, but a plurality of controllers 40 may be included.

The alarm management apparatus 10 may include a communication interface 11, a storage 12, and a processor 13. When an abnormality occurs in the plant or the like, the alarm management apparatus 10 receives information related to the abnormality from the controller 40 via the control network 50 and the communication interface 11, for example, and generates an alarm. However, when the controller 40 includes a function to generate alarms, the alarm management apparatus 10 may receive the alarm via the control network 50 and the communication interface 11, for example. The alarm management apparatus 10 stores the above-described alarm in the storage 12. An example of the function of each component of the alarm management apparatus 10 is described below.

The communication interface 11 may include one or a plurality of communication interfaces capable of communicating with each of the engineering terminal 20, the monitoring terminal 30, and the controller 40. The communication interface may be any communication interface capable of data communication in a wired or wireless manner. The number of communication interfaces 11 is not limited to one.

The storage 12 is a database of all of the alarms generated by the alarm management apparatus 10 or all of the alarms generated by the controller 40. The processor 13, described below, refers to the storage 12 as necessary to perform filtering, as described below. The storage 12 can be implemented using a semiconductor memory, a magnetic memory, or an optical memory, for example. Examples of the storage 12 include read only memory (ROM), flash memory, and dynamic random access memory (DRAM), which is capable of temporarily storing data. The number of storages 12 is not limited to one. The storage 12 may be attached to the alarm management apparatus 10 externally.

The processor 13 receives information related to a filtering condition from the instruction unit 31 of the monitoring terminal 30 via the communication interface 11, for example, and performs filtering on the alarms based on the filtering condition. The processor 13 may store the filtered alarms in a predetermined storage area of the storage 12. When the alarm management apparatus 10 is accessed from the monitoring terminal 30 for the first time, the "predetermined storage area" is a storage area that the processor 13 can secure as needed in the storage 12 based on terminal information of the monitoring terminal 30 and identification information of the operator.

The above-described filtering condition can include a first filtering condition and a second filtering condition. In this case, the processor 13 performs filtering on the alarms based on the first filtering condition and further performs filtering on the alarms based on the second filtering condition. For example, when the first filtering condition includes a "condition related to whether access authority of the monitoring terminal is matched" and a "condition related to whether viewing authority of the operator is matched", and the second filtering condition includes a "condition related to whether the alarm is a desired viewing target of the operator", the processor 13 refers to the storage area matching the access authority of the monitoring terminal 30 and extracts alarms matching the viewing authority of the operator from among the alarms stored in the storage area. Furthermore, the processor 13 extracts alarms that are desired viewing targets of the operator from among the alarms extracted by the above-described method. In FIG. 1, the size of the area A1 schematically indicates the data volume of alarms stored in the storage area matching the access authority of the monitoring terminal 30-1. The size of the area B1 schematically indicates the data volume of alarms matching the viewing authority of an operator 1. The size of the area C1 schematically indicates the data volume of alarms that are the desired viewing target of the operator 1. Furthermore, in FIG. 1, the size of the area A2 schematically indicates the data volume of alarms stored in the storage area matching the access authority of the monitoring terminal 30-2. The size of the area B2 schematically indicates the data volume of alarms matching the viewing authority of an operator 2. The size of the area C2 schematically indicates the data volume of alarms that are the desired viewing target of the operator 2. Such multi-step filtering reduces the ultimate data volume of alarms (the size of area C1 and area C2) to the minimum necessary volume. In other words, the data volume (transmission/communication volume) of alarms to be presented to the operator is reduced. The processor 13 may execute filtering based on the first filtering condition and filtering based on the second filtering condition simultaneously.

The processor 13 presents the alarms filtered in this way to the operator via the monitoring terminal 30. The alarms filtered by the processor 13 may be presented to the operator by any method. For example, the monitoring terminal 30 may acquire the alarms filtered by the processor 13 from the above-described storage area periodically and display the alarms on the display 32. Alternatively, as soon as the filtering of alarms by the processor 13 is complete, the monitoring terminal 30 may acquire the filtered alarms and display the alarms on the display 32. Upon receiving notification that filtering of alarms by the processor 13 is complete, the monitoring terminal 30 may also acquire the filtered alarms from the above-described storage area as necessary and display the alarms on the display 32. The alarms filtered by the processor 13 may also be presented to the operator by the operator accessing the alarm management apparatus 10 via the monitoring terminal 30.

In addition to the above-described filtering, the processor 13 may perform the following processing. The processor 13 may identify updated information (difference information) by comparing a new alarm with an old alarm. The additional effect achieved by this processing is now described. FIG. 2 indicates that the alarm in the upper tier (alarm before the change) changes to the alarm in the lower tier (alarm after the change) due to a change in conditions of the plant or the like over time. The "alarm before the change" corresponds to the old alarm, whereas the "alarm after the change" corresponds to the new alarm. In greater detail, the alarm in the upper tier and the alarm in the lower tier in FIG. 2 have the same alarm identification information ("UP-002 358").

The alarms before and after the change are alarms for the same device and the same process and indicate a change in status due to operation by the operator or a change in conditions. In this case, the processor 13 of the alarm management apparatus 10 identifies only the information in the hatched portion of FIG. 2 (i.e., the difference information). Next, the monitoring terminal 30 acquires only the difference information periodically, for example. The monitoring terminal 30 then generates the alarm after the change by overwriting only the difference information among the information included in the alarm before the change and presents the alarm after the change to the operator. Consequently, the communication volume can be further reduced as compared to when all of the information included in alarms is communicated between the alarm management apparatus 10 and the monitoring terminal 30.

The processor 13 can be implemented using one or a plurality of processors. The various functions described above may be distributed by function across a plurality of processors, or each function may be executed by a plurality of processors cooperating with each other.

(First Processing Example)

Figure 3:
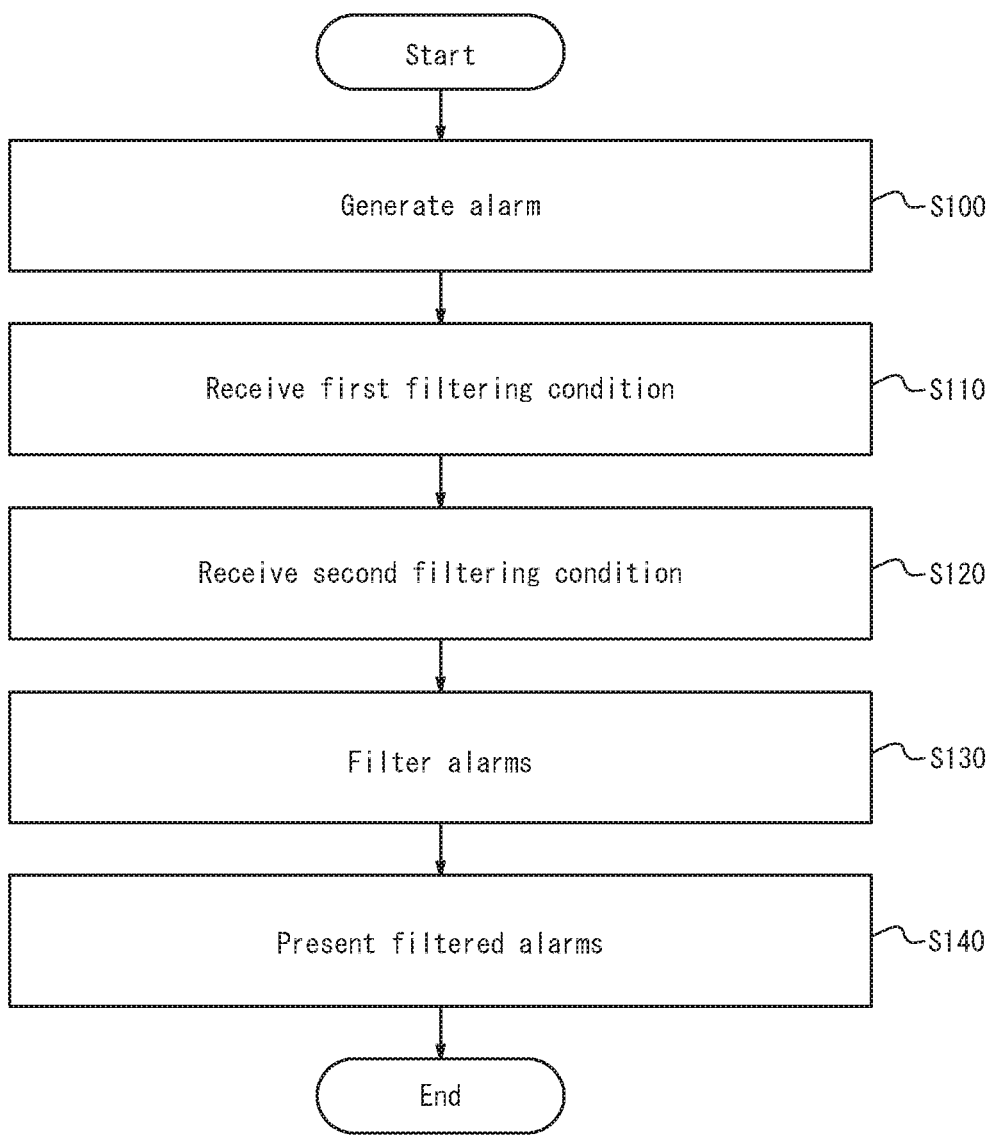
FIG. 3 is a flowchart illustrating a first processing example in the alarm management system of FIG. 1.

Next, a first processing example that can be executed by the alarm management system 1 according to the present embodiment is described with reference to FIG. 3.

In step S100, the processor 13 of the alarm management apparatus 10 generates an alarm based on information received from the controller 40. When the controller 40 itself has a function to generate alarms, the processor 13 of the alarm management apparatus 10 may receive the alarm from the controller 40 via the communication interface 11, for example.

Subsequently, in step S110, the processor 13 of the alarm management apparatus 10 receives information related to the first filtering condition from the instruction unit 31 of the monitoring terminal 30 via the communication interface 11. For example, when the first filtering condition includes a "condition related to whether access authority of the monitoring terminal is matched" and a "condition related to whether viewing authority of the operator is matched", then the processor 13 can receive information related to the first filtering condition via the communication interface 11 after the operator finishes accessing the alarm management apparatus 10 by logging into the monitoring terminal 30.

Here, when the alarm management apparatus 10 is accessed from the monitoring terminal 30 for the first time, the processor 13 may secure a storage area in the storage 12, where alarms after the below-described filtering can be stored, based on terminal information of the monitoring terminal 30 and identification information of the operator.

Subsequently, in step S120, the processor 13 of the alarm management apparatus 10 receives information related to the second filtering condition from the instruction unit 31 of the monitoring terminal 30 via the communication interface 11. When the second filtering condition includes a "condition related to whether the alarm is a desired viewing target of the operator", for example, the processor 13 can receive information related to the second filtering condition via the communication interface 11 at any time based on operation by the operator.

Subsequently, in step S130, the processor 13 of the alarm management apparatus 10 performs filtering on the alarms based on the first filtering condition received in step S110 and the second filtering condition received in step S120. Details of the filtering are as described above.

Here, the processor 13 of the alarm management apparatus 10 may store the filtered alarms in the above-described storage area in step S130.

Subsequently, in step S140, the processor 13 of the alarm management apparatus 10 presents the filtered alarms to the operator via the monitoring terminal 30.

With the first processing example, filtering of alarms is not executed on the monitoring terminal 30 after receipt of a large number of alarms including unwanted alarms. Rather, alarms are filtered on the alarm management apparatus 10, so that alarms with a reduced data volume are presented to the operator via the monitoring terminal 30. Consequently, the communication volume between the alarm management apparatus 10 and the monitoring terminal 30 can be reduced.

(Second Processing Example)

Figure 4:
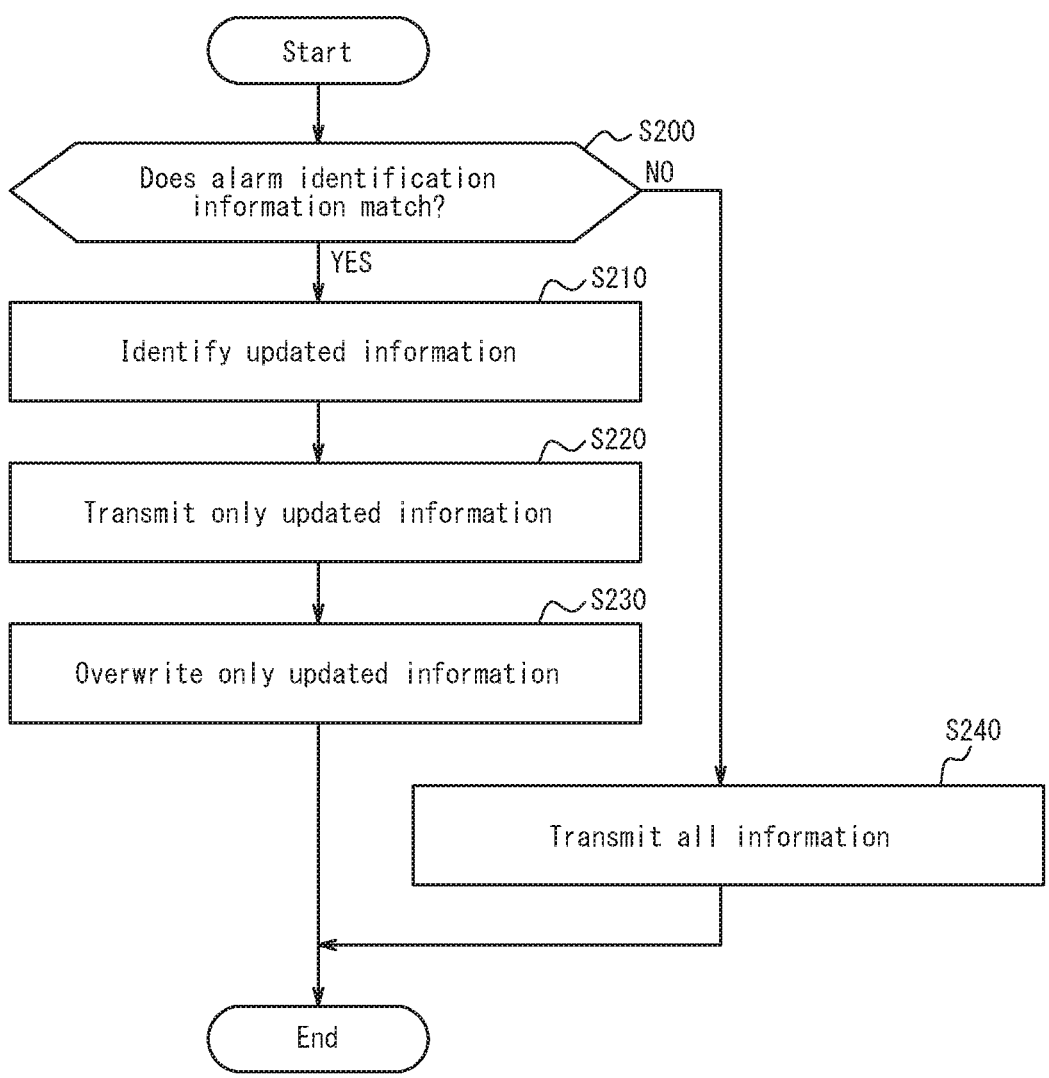
FIG. 4 is a flowchart illustrating a second processing example in the alarm management system of FIG. 1.

Next, a second processing example that can be executed by the alarm management system 1 according to the present embodiment is described with reference to FIG. 4. The alarm management system 1 can execute the second processing example after executing the first processing example. In one example, the first processing example is executed when the alarm management apparatus 10 is accessed for the first time from the monitoring terminal 30, and the second processing example is executed at the time of subsequent access. Accordingly, the "alarm" in the second processing example has its data volume reduced by similar filtering to the first processing example.

In step S200, the processor 13 of the alarm management apparatus 10 judges whether the alarm identification information of a new alarm matches the alarm identification information of an old alarm. If the alarm identification information matches (step S200: YES), the processing proceeds to step S210. If the alarm identification information does not match (step S200: NO), the processing proceeds to step S240.

In the case of proceeding to step S210, the processor 13 of the alarm management apparatus 10 identifies updated information based on a comparison between the new alarm and the old alarm in step S210.

Subsequently, in step S220, the processor 13 of the alarm management apparatus 10 transmits only the updated information to the monitoring terminal 30.

Subsequently, in step S230, the monitoring terminal 30 overwrites the portion of information included in the old alarm, which has alarm identification information matching that of the new alarm, with only the updated information. Consequently, the new alarm formed by the old alarm and the updated information is presented to the operator. The present processing then ends.

Conversely, in the case of proceeding to step S240, the processor 13 of the alarm management apparatus 10 transmits all of the information included in the new alarm to the monitoring terminal 30 in step S240. Consequently, the new alarm is presented to the operator. The present processing then ends.

With the second processing example, only the new information among the information included in the filtered alarms is transmitted from the alarm management apparatus 10 to the monitoring terminal 30. Consequently, the communication volume between the alarm management apparatus 10 and the monitoring terminal 30 can be further reduced.

The present disclosure is based on drawings and embodiments, but it should be noted that a person of ordinary skill in the art could easily make a variety of modifications and adjustments on the basis of the present disclosure. Therefore, such changes and modifications are to be understood as included within the scope of the present disclosure. For example, the functions and the like included in the various steps and the like may be reordered in any logically consistent way. Furthermore, steps and the like may be combined into one or divided.

For example, when the monitoring terminal 30 is a small terminal, such as a smartphone, and the message content of the alarm is approximately several lines, then it might be more efficient for the monitoring terminal 30 to receive all of the information rather than receiving only updated information (difference information) and overwriting information, as in the above-described second processing example. Therefore, the alarm management system 1 may be capable of selecting, with use of the monitoring terminal 30, whether to execute the above-described second processing example. In greater detail, information related to the type and the like of the monitoring terminal 30 may be registered in advance on the alarm management apparatus 10, or before the execution of step S200, the alarm management apparatus 10 may automatically judge the type or a condition of the monitoring terminal 30 (whether it is a mobile terminal, whether the screen size is small, or the like) using information originally contained on the monitoring terminal 30. When the monitoring terminal 30 that presents alarms is a mobile terminal or the like with a limited display area, for example, the alarm management apparatus 10 may transmit the new alarm itself rather than only the difference information of each alarm to the monitoring terminal 30.

When a piece of equipment is in an abnormal state in a plant or the like due to process modulation or device failure, a secondary process abnormality may occur in another piece of equipment. In such a case, treating both the alarm indicating the abnormality at the origin (trigger alarm) and the alarm indicating the secondary abnormality as monitoring targets of the operator could lead to an important alarm being overlooked. The alarms may be filtered so that only the alarm indicating the abnormality at the origin is presented to the operator, without the alarm indicating the secondary abnormality being presented to the operator. In other words, the filtering condition may include an alarm suppression condition.

Figure 5:
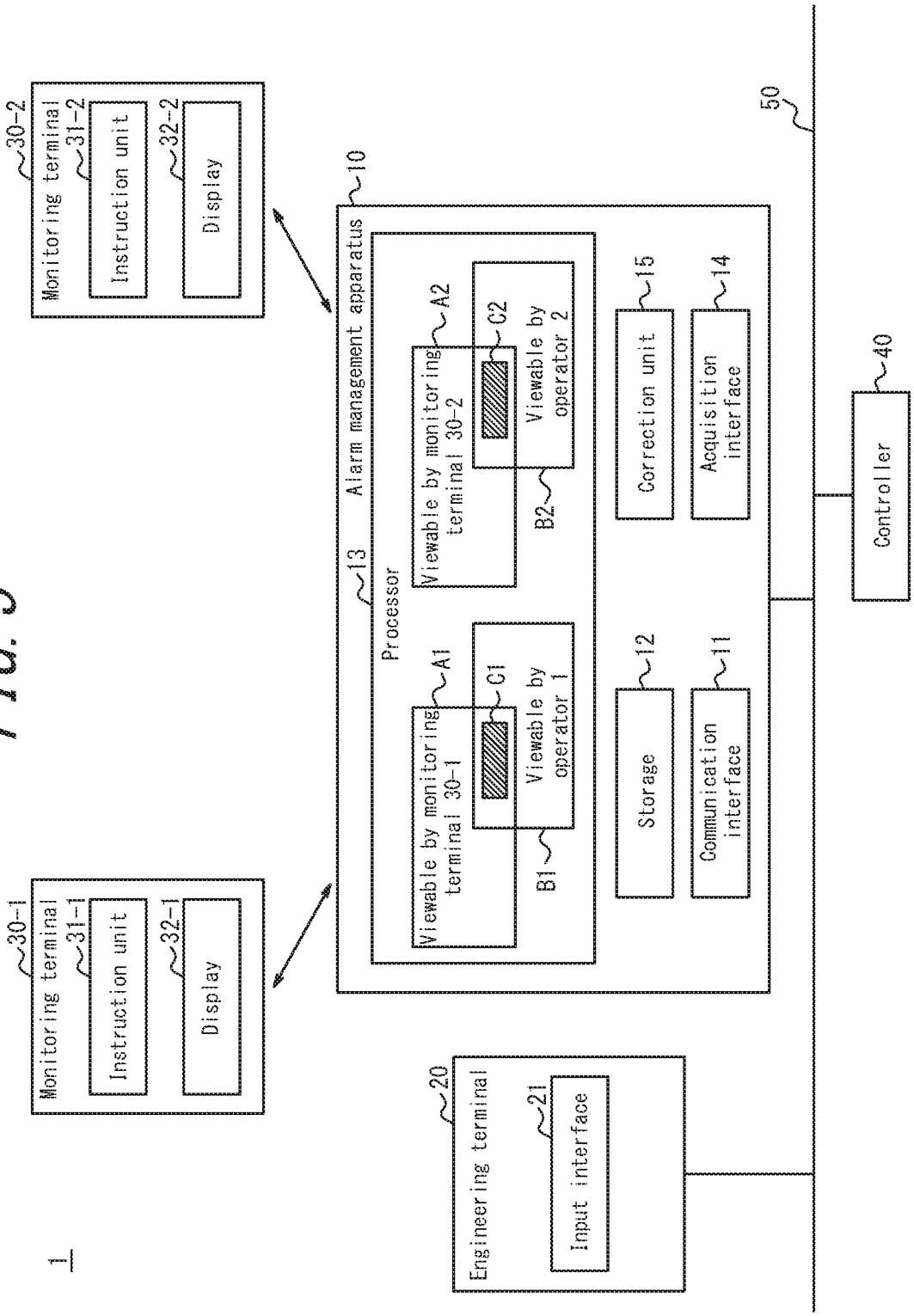
FIG. 5 illustrates the configuration of the alarm management system according to a modification of the present disclosure.

If an alarm that occurs while the power to the alarm management apparatus 10 is OFF has the same alarm identification information as the alarm identification information of an alarm that occurred in the past, the alarm state in the controller 40 and the alarm state in the alarm management apparatus 10 may differ. In this case, with reference to FIG. 5, an acquisition interface 14 included in the alarm management apparatus 10 may acquire the new alarm state from the controller 40, and a correction unit 15 included in the alarm management apparatus 10 may correct the old alarm state to the new state. The acquisition interface 14 may include one or a plurality of communication interfaces capable of communicating with the controller. The correction unit 15 can be implemented using one or a plurality of processors. The communication interface 11 in the above embodiment may also have the function of the acquisition interface 14, and the processor 13 may also have the function of the correction unit 15.

INDUSTRIAL APPLICABILITY

The present disclosure can provide an alarm management system and an alarm management method capable of reducing the communication volume between an alarm management apparatus and a monitoring terminal.

The invention claimed is:

1. An alarm management system comprising:
an alarm management apparatus;
a monitoring terminal; and
a controller;
wherein the alarm management apparatus is configured to:
generate an alarm based on information received from the controller, or receive an alarm from the controller;
receive information related to a filtering condition from the monitoring terminal;
perform filtering on the alarm based on the filtering condition; and
transmit the alarm subjected to the filtering to the monitoring terminal,
wherein, based on a comparison between a new alarm and an old alarm, the alarm management apparatus is configured to identify updated information among information included in the new alarm, and to transmit only the updated information to the monitoring terminal.

2. The alarm management system of claim 1, wherein the filtering condition includes a first filtering condition and a second filtering condition.

3. The alarm management system of claim 2, wherein the first filtering condition includes a condition related to whether the generated or received alarm matches a viewing authority of an operator, and the second filtering condition includes a condition related to whether the generated or received alarm is a desired viewing target of the operator.

4. The alarm management system of claim 1, wherein the filtering condition includes a suppression condition of the generated or received alarm.

5. The alarm management system of claim 1, wherein the monitoring terminal is configured to acquire only the updated information from the alarm management apparatus.

6. The alarm management system of claim 1, wherein the alarm management apparatus is configured to transmit only the alarm subjected to filtering to the monitoring terminal.

7. An alarm management method using an alarm management system, the alarm management method executed by an alarm management apparatus comprising:
generating an alarm based on information received from a controller, or receiving an alarm from the controller;
receiving information related to a filtering condition from a monitoring terminal;
performing filtering on the alarm based on the filtering condition; and
transmit the alarm subjected to the filtering to the monitoring terminal,
wherein, based on a comparison between a new alarm and an old alarm, the alarm management apparatus is configured to identify updated information among information included in the new alarm, and to transmit only the updated information to the monitoring terminal.

8. The alarm management method of claim 7, wherein only the alarm subjected to filtering is transmitted to the monitoring terminal.

* * * * *